Sept. 24, 1946. W. H. WIRKLER 2,408,120
RADIO DIRECTION FINDING SYSTEM
Filed Sept. 12, 1939 2 Sheets-Sheet 1
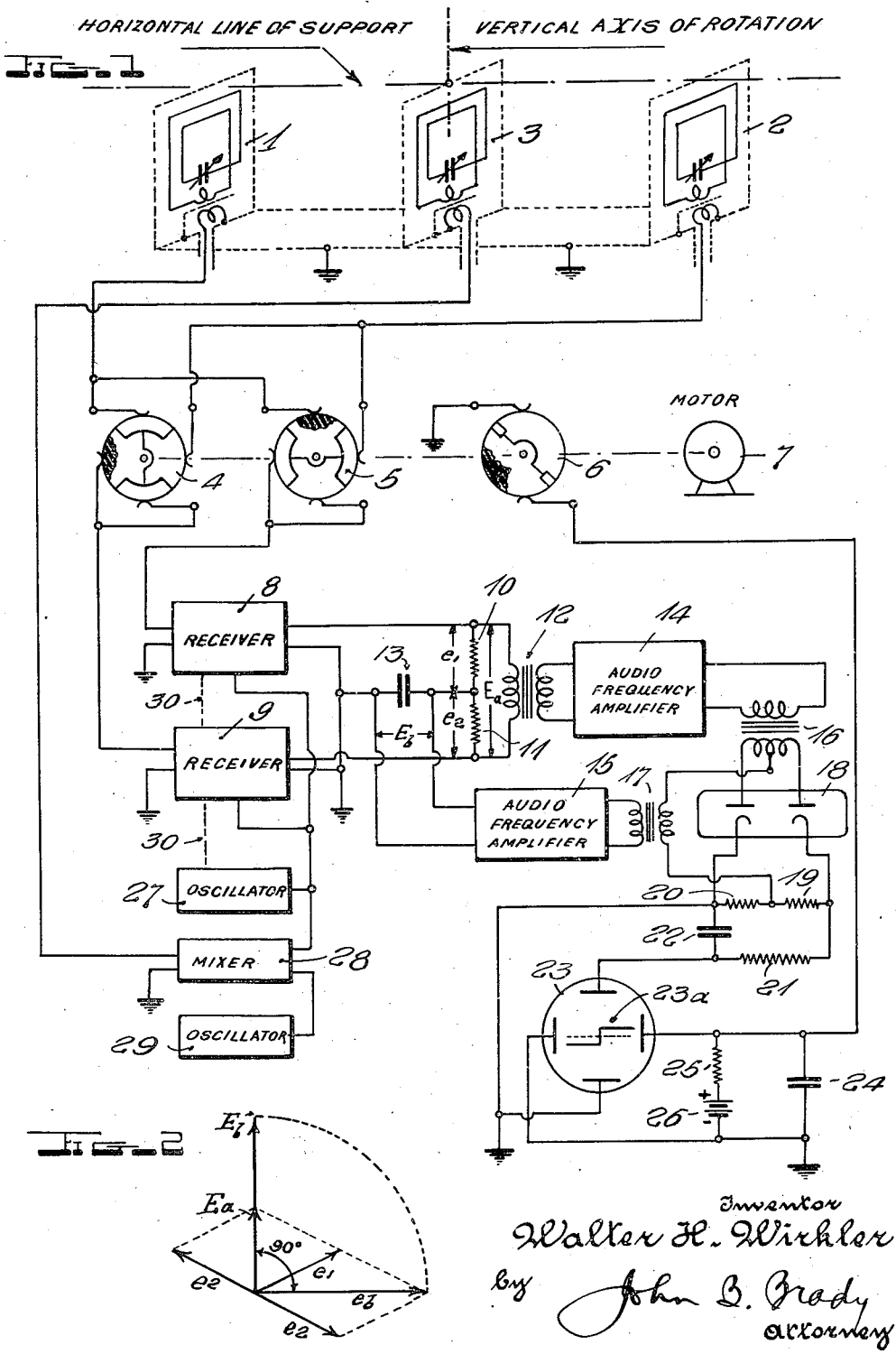

Sept. 24, 1946.   W. H. WIRKLER   2,408,120
RADIO DIRECTION FINDING SYSTEM
Filed Sept. 12, 1939   2 Sheets-Sheet 2
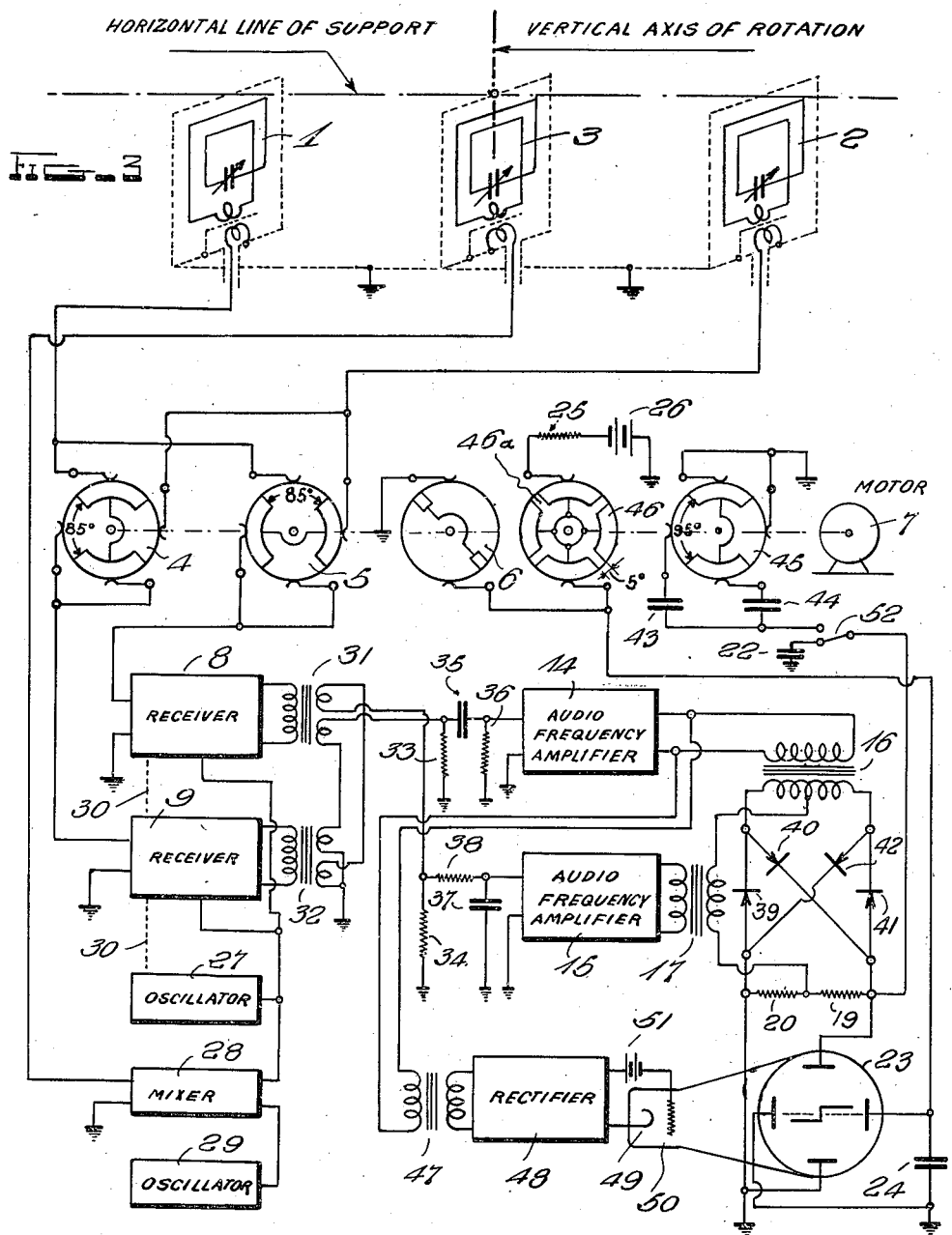
Walter H. Wirkler,
by John B. Grady
Attorney Patented Sept. 24, 1946

2,408,120

UNITED STATES PATENT OFFICE 2,408,120

RADIO DIRECTION FINDING SYSTEM

Walter H. Wirkler, Cedar Rapids, Iowa, assignor to Collins Radio Company, Cedar Rapids, Iowa, a corporation of Iowa Application September 12, 1939, Serial No. 294,522

13 Claims. (Cl. 250—11)

My invention relates broadly to radio direction finding systems and more particularly to a direction finder having commutated antennas and visual indicating means.

This application is a continuation-in-part of my co-pending application Serial Number 274,039, filed May 16, 1939, for Heterodyne radio direction finding system.

One of the objects of my invention is to provide means for the elimination of bearing errors caused by unequal audio frequency phase shifts in the two receivers of a phase-measuring radio direction finding system.

Another object of my invention is the provision of visual indicating means for improving the performance of the direction finder, particularly as regards operation on weak signals in the presence of noise.

A further object of my invention is to provide balanced rectifier means operated by the difference and by the sum of the outputs from both receivers of the direction finder for supplying a deflection voltage for an oscilloscope varying as the phase difference of the audio signal voltages in the two receivers.

Still another object of my invention is to provide commutator means for alternately connecting the receiving loop antennas to the different receivers for reversing the direction of deflection in the oscilloscope, the extent of deflection being equal in each direction for a given phase difference in the received signals.

A still further object of my invention is to provide means for supplying a sweep voltage for the oscilloscope controlled in relation to the reversal of direction of deflection in the oscilloscope, for producing an oscillograph indicating by differences in deflection in successive portions thereof a difference in phase in the received signals.

Still another object of my invention is to provide visual indicating means for a radio direction finder with sense indications afforded by virtue of visual indications made in relatively opposite directions.

Other and further objects reside in the system of my invention as will be understood from the following description made with reference to the accompanying drawings, in which:

Figure 1 is a schematic diagram of a representative form of my invention; Fig. 2 is a vector diagram of voltage relations in a portion thereof; and Fig. 3 is a schematic diagram illustrating various modifications, in details, of the arrangement shown in Fig. 1.

As set forth in my copending application Serial No. 274,039, supra, two similar loop antennas 1 and 2 are mounted at the ends of a horizontal supporting arm of suitable length pivoted on a vertical axis at its center, as indicated in Fig. 1. A third loop antenna 3, tuned by a condenser, is mounted midway between the antennas 1 and 2 and serves as the injector antenna. The three loop antennas are in parallel planes, as indicated, and are at right angles to the horizontal line of support. Each loop antenna is of the balanced type and may be enclosed by electrostatic shielding means.

The output of each of the receiving antennas 1 and 2 is connected alternately and individually to separate receiving circuits 8 and 9 through commutator devices 4 and 5, which are synchronized with each other and operated in determined relation with respect to a shunt switch 6, as hereinafter more fully described. Motor 7 is employed to drive the commutator devices 4 and 5 and switch 6, in common.

The audio output of receiver 8 flows through resistor 10 and condenser 13, and produces a potential drop $e_1$ across resistor 10, while that from receiver 9 flows through resistor 11 and condenser 13 and produces a potential drop $e_2$ across resistor 11. A ground connection is provided at the condenser terminal common to both receivers. Transformer 12 is connected across resistors 10 and 11, and receives an audio voltage $E_a$ proportional to the vector difference of the two receiver outputs, $e_1-e_2$, as indicated in Fig. 2, which is amplified by an audio frequency amplifier 14 and applied, through transformer 16, differentially to the plates of balanced rectifier 18. Condenser 13 is connected across the input of an audio frequency amplifier 15 and supplies a voltage $E_b$ thereto in accordance with the vector sum of the two receiver outputs, $e_1+e_2$ in Fig. 2. The actual vector sum $e_b$ is given a phase shift of essentially 90 degrees by condenser 13 to bring it substantially in phase with the voltage $E_a$ applied to transformer 12. The output of amplifier 15 is applied through transformer 17 to a center tap on the secondary of transformer 16, and a center connection between load resistors 19 and 20 connected with the cathodes of balanced rectifier 18.

The currents supplied to rectifier 18 are therefore substantially in phase, but current from amplifier 14 is wholly dependent upon the phase relation of the signals supplied to receivers 8 and 9, the vector difference $E_a$ being zero when outputs $e_1$ and $e_2$ are equal in value and of the same phase. Current supplied to rectifier 18 from amplifier 15 is dependent in magnitude upon the relative phase of the voltages $e_1$ and $e_2$, and under conditions of like phase in these components rectifier 18 receives current only from transformer 17, but in balanced relation so that the currents in resistors 19 and 20 are equal and opposite. Unequal currents in resistors 19 and 20 result when voltages $e_1$ and $e_2$ are not of like phase and current is applied to rectifier 18 from transformer 16, whereupon rectifier 18 delivers a control voltage proportional to the out of phase relation of the voltages $e_1$ and $e_2$.

The output of rectifier 18, taken from resistors 19 and 20, is filtered by resistor 21 and condenser 22 and applied to the vertical deflection plates in a cathode ray oscilloscope 23. The result is that the direct current output of rectifier 18, and the resulting vertical deflection of the beam of the oscilloscope from a normal middle position, are proportional to the phase difference in the audio frequency outputs of the two receivers.

In the positions in which commutator devices 4 and 5 are shown, receiver 8 is connected with antenna 2 and receiver 9 with antenna 1. At one-quarter revolution later, the commutator devices will be in position to connect receiver 8 with antenna 1 and receiver 9 with antenna 2. With the receivers thus changedly connected, the phase difference in the signals at the outputs thereof will cause a deflection in the oscilloscope opposite in direction to that resulting from the preceding position.

Sweep voltage for the cathode ray oscilloscope 23 is provided by the charging and discharging of a condenser 24 connected to the horizontal deflection plates in the oscilloscope. Condenser 24 is connected in circuit with a resistance 25 across a direct current source shown as battery 26, the sweep voltage increasing as the condenser is charged through the resistance 25 from source 26. Condenser 24 is discharged by the operation of shunt switch 6 whereby the sweep voltage is abruptly reduced to zero.

At every second commutation of the loops, switch 6 completes a shunt circuit to ground across condenser 24, for discharging the condenser. During other parts of the cycle, including the intermediate commutation of the loops, condenser 24 is being charged from the source 26 through resistor 25, thus providing a horizontal sweep voltage for the oscilloscope in synchronism with the commutation of the antennae and covering the period of operation of each receiver in connection with each antenna. The result is that if the audio phase difference of the receiver outputs changes when the loops are commutated, a break in the horizontal line of the oscilloscope pattern will occur, as shown at 23a on the oscilloscope 23.

An important feature of this arrangement is that a phase difference in the receiver outputs caused by inequality of the two receivers will be constant and will not cause a break in the line of the oscilloscope pattern. Any break in the pattern, therefore, will be an indication of phase difference resulting from commutation of the loops. Hence, the only source of instrument error in this direction finder lies in unequal tuning of the loops, which has been shown in my copending application Serial No. 274,039, supra, to be small in effect as compared to the errors which might be introduced in the intermediate frequency amplifier stages of the receivers. In the system of my invention herein disclosed, the receiving circuits produce no error in the ultimate indication and receivers with more stages of radio frequency amplification may therefore be used ahead of the first detector, and also intermediate frequency amplifier stages with greater selectivity may be used, without fear of errors caused by unequal phase shift in these circuits. Hence, much better selectivity and a higher signal-to-noise ratio are obtained.

Another feature of this arrangement is that the oscilloscopic indicating means provides more satisfactory operation in the presence of noise. In order to accomplish this object better in the heterodyne direction finder, use is made of the balanced rectifier 18, excited both by the difference voltage from amplifier 14 and by the sum voltage from amplifier 15, which has a considerably higher signal-to-noise ratio, to take full advantage of the oscilloscopic method of visual indication in overcoming the effects of receiver noise. The voltage applied to the rectifier 18 through amplifier 14 and transformer 16 will not result in a rectified voltage across condenser 22 and the vertical deflection plates of the oscilloscope 23 unless there is applied through amplifier 15 and transformer 17 a voltage of the same frequency and essentially the same phase. Hence, the audio voltage applied through transformer 17, which is relatively free of noise, operates selectively to obtain rectification of audio voltage of the same frequency from transformer 16, discriminating against random noise voltage from transformer 16 and avoiding the effect thereof on the indication of the oscilloscope. Further, if these random noises originate in the receivers themselves instead of being picked up in the collector antenna system, their effect, if any, will not change with antenna commutation and, therefore, they will not cause a break in the oscilloscope pattern as does a signal received in the two collector loops at slightly different phase angles.

Another feature of my invention is that it provides sense indication in that when the antenna system is rotated clockwise from the position giving a straight line on the screen of oscilloscope 23, the left side of the image, for example, will be the higher than when the antenna system is rotated counterclockwise. This is due to the fact that the polarity of the rectified output of rectifier 18 depends on the sense of the phase relation between the voltage applied to transformer 16 and that applied to transformer 17.

The injector loop antenna 3 is energized substantially in the manner described in my copending application Serial No. 274,039, supra. Receivers 8 and 9 are illustrated as being of the superheterodyne type with a local conversion oscillator at 27 common to both receivers. The receivers 8 and 9 and the oscillator 27 are tuned simultaneously through a common arrangement represented at 30. Oscillator 29 supplies energy for the injector loop antenna 3 which is connected therewith through a mixer circuit 28 to which is also supplied a portion of the output of conversion oscillator 27. Oscillator 29 operates at a frequency differing from the intermediate frequency of amplification in the receivers 8 and 9 by a few hundred cycles to provide the audio frequency which characterizes the outputs of receivers 8 and 9, which outputs are supplied to amplifiers 14 and 15 as hereinbefore set forth. The frequency of the energy supplied to the injector loop is maintained within a few hundred cycles of the received signal frequency by the operation of energy from oscillator 27 in the mixer circuits 28, from which energy is supplied to the injector antenna at the proper frequency for heterodyning with the received signals of selected frequency, as set forth more fully in my copending application, supra.

The circuit arrangement illustrated in Fig. 3 embodies various modifications in and additions to the basic system as disclosed in Figs. 1 and 2. Transformers 31 and 32 having split secondary windings are connected to the outputs of receivers 8 and 9, respectively, and the split secondaries interconnected so as to supply the sum of the output voltages to amplifier 14 and the difference of the voltages to amplifier 15. The phase shift required to bring the sum and difference voltages in phase is effected in the amplifier input circuits. Coupling resistors 33 and 34 are individually of a value for matching the impedances of the respective output transformer circuits. Condenser 35 and resistor 36 connected with coupling resistor 33 are identical with condenser 37 and resistor 38, respectively, connected with coupling resistor 34, but are so arranged that the output voltages are relatively displaced 90° in phase, thus being transmitted in like phase to amplifiers 14 and 15. The vector analysis shown in Fig. 2 applies equally as well to this modification as to the arrangement in Fig. 1.

Another modification made in Fig. 3 is an improvement of the rectifier circuits, tube 18 being replaced by a doubly balanced or "ring" type rectifier connected similarly as tube 18 with transformers 16 and 17 and the load resistors 19 and 20. The doubly balanced rectifier comprises four rectifier units 39, 40, 41 and 42 connected in a closed "ring" circuit as shown, and is supplied with current from transformer 16 at opposite points in the circuit and from transformer 17 at center tap connections on the secondary of transformer 16 and resistors 19 and 20. The output is taken from the remaining opposite points of the circuits, or from across resistors 19 and 20 in series.

Fundamental frequency voltages from both transformers 16 and 17 are balanced out in the output, so that it is immaterial from the standpoint of balancing audio voltages whether the sum or the difference voltage is applied to the upper channel 14; in the arrangement of Fig. 1, it is preferred that the greater sum voltage be applied to transformer 17, and thus in balanced relation to the rectifier 18, so as to reduce the audio components in the rectifier output, inasmuch as the circuit is not balanced for the input from transformer 16. The doubly balanced rectifier 39—42 has in its output direct currents and even-harmonic voltages, the latter being removed by a filter condenser which may be smaller than the filter condenser required in the arrangement of Fig. 1.

The operation of the doubly balanced rectifier is essentially the same as that of the rectifier 18. That is to say, if the receiver voltages are in phase but differ by a small amount in amplitude, the difference voltage will be in phase with the sum voltage at the receivers but 90 degrees out of phase at the rectifier input and no direct current will result. Again, if the receiver output voltages are nearly equal in amplitude but differ slightly in phase, there will be an out of phase component becoming an in phase component at the rectifier input and resulting in a rectified voltage proportional to the initial out of phase relation and adapted to produce a vertical deflection in the oscilloscope.

As above mentioned, the use of the doubly balanced rectifier allows the use of a smaller filter condenser. Condenser 22 is shown connected by switch 52 in the same relation as filter condenser 22 in Fig. 1, although, as noted, the condenser in Fig. 3 may be of smaller capacity. Another arrangement is shown for use with switch 52 moved to its alternate position in which condensers 43 and 44 are connected with the rectifier. This latter circuit operates to reduce noise further by allowing an increase in the capacity of the filter condensers without causing distortion of the oscilloscope image because of the increased charging and discharging time of the condensers, and is adapted especially for continuous carrier signals. An additional commutator element 45 is employed driven by the common motor 7, with contacts for alternately connecting the filter condensers 43 and 44 to ground whereby neither condenser is required to be charged and discharged with each commutation and larger condensers may be used without distortion of the oscilloscope image. Hence, it is possible by this arrangement to use the direction finder on comparatively weak radio telephone signals. The operation is in accord with the principle that any wave analyzer which selects a narrow band of frequencies to the exclusion of all others must integrate over a large interval of time.

For radio telegraph signals a smaller capacity of filter condenser is preferable for producing a clear image, and this is readily provided at condenser 22. Another factor affecting clarity is synchronism between the keying rate and the rate of commutation. Under these conditions the image on one side of the screen might be affected by the signal while that on the other side remains unaffected by the signal for several seconds, making it impossible to compare the two halves of the image. This factor may be adjusted by controlling the speed of the commutator driving motor so as to avoid synchronism with the rate of keying.

Another solution which would minimize the effect of synchronism is to block out the image on the oscilloscope automatically except in the presence of a signal. In Fig. 3, the sum value of the signals is partially diverted through transformer 47 from the output of amplifier 14 to a rectifier 48, the output of which is applied in series with a source of bias potential 51 between the cathode 49 and a control grid 50 in the oscilloscope 23. The bias voltage at source 51 is provided to suppress the image on the oscilloscope in the absence of signal energy in the rectifier 48. The only effect of synchronism in the commutating and keying frequencies in such an arrangement is the absence of any image from one side of the oscilloscope screen. However, if the synchronism is not exact, or if dots and dashes are employed as in normal Morse code, there will be times when there is an image on each side of the screen, and this intermittent full image is easier to interpret than the double image obtained without the keying rectifier 48.

Arbitrarily, the antenna commutator elements were designed with an overlap of five degrees, that is, all circuits are closed before any are opened in order to improve the operation of the system, and avoid critical adjustments of the commutator brushes. One effect of the five degree overlap, however, was a separation of the two halves of the oscilloscope image which somewhat impaired the clarity of the indication. To eliminate this factor, an additional commutator section 46 is provided driven by motor 7, with insulation inserts 46a to break the charging current and the sweep circuit condenser 24 during the five degree overlap in the commutation. The electron beam thus ceases to move horizontally during this interval and the two halves of the image are maintained close together for maximum clarity in comparison.

In commutator section 45, connected with the filter condensers 43 and 44, a five degree overlap on the insulation portions is provided to prevent short circuiting of the condensers 43 and 44 through the commutator. In this instance, both circuits are opened before either is closed.

While I have described my invention in a preferred embodiment, I intend no limitations thereby upon my invention and I desire it understood that modifications may be made within the scope of the appended claims.

What I claim as new and desire to secure by Letters Patent of the United States is as follows:

1. In a radio direction finding system, a directional antenna system including at least two receiving antennae, two separate receiving circuits, commutator means for alternately connecting said receiving circuits individually to each of said receiving antennae, means cooperatively energized by the outputs of both said receiving circuits for producing a voltage proportional to the phase difference of the signals received at the respective antennae, and visual indicating means energized by said voltage with said commutator means producing a reversal in the sense of the indication of said voltage upon the alternate connection of said receiving circuits with respect to said antennae.

2. In a radio direction finding system, a directional antenna system including at least two receiving antennae, separate receiving circuits, commutator means for alternately connecting said receiving circuits individually to each of said receiving antennae, means for producing a voltage proportional to the vector difference of the output voltages of said receiving circuits, means for producing a voltage proportional to the vector sum of the output voltages of said receiving circuits and substantially in phase with the aforesaid voltage, balanced rectifier means cooperatively energized by both said voltages for producing a direct voltage proportional to the phase difference of the signals received at the respective antennae, and visual indicating means energized by said direct voltage with said commutator means producing a reversal in the polarity of said direct voltage and in the sense of the indication of said direct voltage upon the alternate connection of said receiving circuits with respect to said antennae.

3. In a radio direction finding system wherein directional indications are dependent upon the phase relation of two independent currents, a visual indicating system comprising means cooperatively energized by both said currents for producing a direct voltage proportional to the phase difference in the currents, visual indicating means energized by said voltage, and means for interchanging said currents in respect to the operation of the first said means for reversing the polarity of the direct voltage produced and the sense of the indication of said voltage, whereby the presence of a phase difference is evident from the reversal of said indication and the magnitude of said phase difference from the amplitude of said indication.

4. In a radio direction finding system wherein directional indications are dependent upon the phase relations of two independent currents, a visual indicating system comprising rectifier means cooperatively energized by both said currents for producing a direct voltage proportional to the phase difference in the currents, a cathode ray oscilloscope having one set of deflecting plates energized by said voltage and a second set of deflecting plates disposed normal to the first said set, commutator means for interchanging said currents in respect to the operation of said rectifier means for reversing the polarity of said direct voltage and the direction of deflection produced thereby in said oscilloscope, and means for supplying a sweep voltage to said second set of deflecting plates in timed relation to the operation of said commutator means for producing at least two reversals of direction of deflection in said oscilloscope in a cycle of operation of said sweep voltage.

5. In a heterodyne radio direction finding system, a directional antenna system including at least two signal receiving antennae and a locally energized injector antenna coupled in like relation to both said receiving antennae, separate receiving circuits including detector means for said receiving antennae, commutator means for alternately connecting said receiving circuits individually to each of said receiving antennae, said receiving circuits having heterodyne audio frequency output currents derived in said detector means from received signal energy and energy from said injector antenna and varying in phase relation as the signals received at the respective receiving antennae, rectifier means cooperatively energized by both said currents for producing a direct voltage proportional to the phase difference in the currents, and visual indicating means energized by said voltage with said commutator means producing a reversal in the polarity of said direct voltage and in the sense of the indication of said direct voltage upon the alternate connection of said receiving circuits with respect to said antennae.

6. In a heterodyne radio direction finding system, a directional antenna system including at least two signal receiving antennae and a locally energized injector antenna coupled in like relation to both said receiving antennae, separate receiving circuits including detector means for said receiving antennae, and commutator means for alternately connecting said receiving circuits individually to each of said receiving antennae, said receiving circuits having heterodyne audio frequency output currents derived in said detector means from received signal energy and energy from said injector antenna and varying in phase relation as the signals received at the respective receiving antennae; means for producing a voltage proportional to the vector difference of said output currents, means for producing a voltage proportional to the vector sum of said output currents, said sum and difference vector voltages being in phase quadrature, and phase shifting means for placing said voltages in like phase; balanced rectifier means energized by the voltage proportional to the vector difference of said currents in differential relation and by the voltage proportional to the vector sum of said currents in balanced relation, said rectifier being operative to produce a direct voltage proportional to the phase difference of the said output currents by rectification of the vector difference voltage in a polarity determined by its relation to the vector sum voltage, and said vector sum voltage having a higher signal-to-noise ratio than said vector difference voltage and operating to obtain selective rectification of the vector difference voltage of like frequency and phase; and visual indicator means energized by said direct voltage with said commutator means producing a reversal in the polarity of said direct voltage and in the sense of the indication of said direct voltage upon the alternate connection of said receiving circuits with respect to said antennae.

7. In a radio direction finding system wherein directional indications are dependent upon the phase relation of two independent signal currents in separate receiving circuits, means for preventing error in said indications due to unequal phase shift in said currents introduced by said separate receiving circuits, comprising means for converting a phase difference in the independent signal currents into a direct signal voltage proportional to the phase difference, indicator means energized by said voltage, and means for interchanging said currents for operation alternately with respect to said separate receiving circuits and for reversing the sense of the indication of said signal voltage, incidental phase variations introduced by said separate receiving circuits being constant in effect in said indicating means upon the reversal in sense of the indication of said signal voltage whereby the presence of a phase difference in the signal currents is evident from the reversal of said indication and the magnitude of said phase difference from the amplitude of said indication.

8. In a radio direction finding system wherein directional indications are dependent upon the phase relation of independent signal currents in separate receiving circuits, means for reducing the effect of random noise in producing such indications, comprising means for producing a voltage proportional to the vector difference between the output currents from said receiving circuits, means for producing a voltage proportional to the vector sum of said output currents and substantially in phase with the aforesaid voltage, balanced rectifier means energized by the vector difference voltage in differential relation and by the vector sum voltage in balanced relation, said rectifier being operative to produce a direct voltage proportional to the phase difference of the said currents by rectification of the vector difference voltage in a polarity determined by its relation to the vector sum voltage, said vector sum voltage having a higher signal-to-noise ratio than said vector difference voltage and operating to obtain selective rectification of the vector difference voltage of like frequency and phase to the exclusion of random noise in said vector difference voltage, and visual indicator means energized by said direct voltage for indicating said phase difference with greater clarity in the absence of random noise distortion.

9. In a radio direction finding system wherein directional indications are dependent upon the phase relation of two independent signal currents in separate receiving circuits, rectifier means cooperatively energized by both said currents for producing a signal voltage proportional to the phase difference between said currents, indicator means energized by said voltage, means for interchanging said currents with respect to the operation of said rectifier means for reversing the sense of the indication of said signal voltage, filter means including dual filter elements, and commutator means for alternately connecting each of said elements with said rectifier means in synchronism with the interchange of said currents, said filter elements each being of a value substantially to exclude alternating currents and distortion factors from said indicator means.

10. In a radio direction finding system, the combination set forth in claim 1 with said means for producing a voltage proportional to the phase difference of the received signals comprising a doubly balanced rectifier circuit in the output of which components of the fundamental frequency of each signal are absent, whereby said visual indicating means receives the said voltage proportional to the phase difference of the received signals in substantially singular relation.

11. In a radio direction finding system, apparatus as set forth in claim 4 wherein a selected degree of overlap is provided in said commutator means, and including separate commutator means synchronized with the said commutator means and connected with said means for supplying a sweep voltage for interrupting the operation of the last mentioned means during the overlap period in the first said commutator means, whereby a continuous signal indication is provided independent of the degree of overlap.

12. In a radio direction finding system adapted for operation with telegraph signals, apparatus as set forth in claim 4 with said cathode ray oscilloscope including a control grid electrode normally biased for suppressing the cathode ray in said oscilloscope, and means energized by said currents for supplying a control potential and connected with said grid for producing the cathode ray under the control of said currents, said ray being subjected to deflection in accordance with the potentials on said deflecting plates for producing a directional indication.

13. In a heterodyne radio direction finding system, a directional antenna system including at least two signal receiving antennae and a locally energized injector antenna coupled in like relation to both said receiving antennae, separate receiving circuits including detector means for said receiving antennae, commutator means for alternately connecting said receiving circuits individually to each of said receiving antennae, said receiving circuits having heterodyne audio frequency output currents derived in said detector means from received signal energy and energy from said injector antenna and varying in phase relation as the signals received at the respective receiving antennae, rectifier means cooperatively energized by both said currents for producing a direct voltage proportional to the phase difference in the currents, and visual indicating means energized by said voltage and adapted to indicate direction through both the polarity and magnitude of said direct voltage.

WALTER H. WIRKLER.